US011374992B2

(12) United States Patent
Swanston

(10) Patent No.: US 11,374,992 B2
(45) Date of Patent: Jun. 28, 2022

(54) SEAMLESS SOCIAL MULTIMEDIA

(71) Applicant: OVNIO Streaming Services, Inc., Baltimore, MD (US)

(72) Inventor: Jason A. Swanston, Brooklyn, NY (US)

(73) Assignee: OVNIO Streaming Services, Inc., Baltimore, MD (US)

( * ) Notice: Subject to any disclaimer, the term of this patent is extended or adjusted under 35 U.S.C. 154(b) by 149 days.

(21) Appl. No.: 16/373,560

(22) Filed: Apr. 2, 2019

(65) Prior Publication Data

US 2019/0306211 A1    Oct. 3, 2019

Related U.S. Application Data

(60) Provisional application No. 62/651,660, filed on Apr. 2, 2018.

(51) Int. Cl.
| | |
|---|---|
| *H04L 65/611* | (2022.01) |
| *H04L 65/80* | (2022.01) |
| *H04N 21/242* | (2011.01) |
| *H04L 65/60* | (2022.01) |
| *H04L 65/65* | (2022.01) |

(52) U.S. Cl.
CPC ........ *H04L 65/4076* (2013.01); *H04L 65/607* (2013.01); *H04L 65/608* (2013.01); *H04L 65/80* (2013.01); *H04N 21/242* (2013.01)

(58) Field of Classification Search
CPC . H04L 65/4076; H04L 65/607; H04L 65/608; H04L 65/80; H04N 21/242
See application file for complete search history.

(56) References Cited

U.S. PATENT DOCUMENTS

| | | | | |
|---|---|---|---|---|
| 6,785,708 | B1* | 8/2004 | Busey | G06Q 30/02 |
| | | | | 709/204 |
| 9,292,826 | B1* | 3/2016 | Chen | H04L 65/607 |
| 2004/0128342 | A1* | 7/2004 | Maes | H04L 65/4092 |
| | | | | 709/200 |
| 2004/0246895 | A1* | 12/2004 | Feyerabend | H04L 47/29 |
| | | | | 370/229 |
| 2006/0007916 | A1* | 1/2006 | Jones | H04L 47/10 |
| | | | | 370/352 |

(Continued)

*Primary Examiner* — Lance Leonard Barry
*Assistant Examiner* — Timothy Sowa
(74) *Attorney, Agent, or Firm* — Han Santos, PLLC

(57) ABSTRACT

A seamless social multimedia streaming server and service is disclosed. The server receives multiple multimedia streams that are asynchronous, semi-synchronous or synchronous. The communications channels that the streams are on may be unidirectional, bidirectional or multicast. A multimedia integrator receives streams and integrates the different multimedia into an integrated multimedia stream which is rendered on a client-side device. Because multimedia streams may be integrated onto a single integrated stream, user generated content, such as texts and commentary, may be rendered while viewing other streamed multimedia, such as video. In this way, users that are geographically remote to each other, may communally participate in a multimedia experience via substantively real-time communications. Techniques to interleave multimedia, synchronize multimedia, and to modify multimedia are also disclosed.

19 Claims, 6 Drawing Sheets

(56) References Cited

U.S. PATENT DOCUMENTS

| | | | | |
|---|---|---|---|---|
| 2006/0256130 | A1* | 11/2006 | Gonzalez | G06F 16/958 345/619 |
| 2007/0005795 | A1* | 1/2007 | Gonzalez | H04N 19/186 709/232 |
| 2007/0238447 | A1* | 10/2007 | Balestrieri | H04N 21/4661 455/414.1 |
| 2008/0170490 | A1* | 7/2008 | Connors | H04N 21/235 370/203 |
| 2010/0202368 | A1* | 8/2010 | Hans | H04L 65/602 370/329 |
| 2010/0257280 | A1* | 10/2010 | Stokking | H04L 65/80 709/231 |
| 2012/0078994 | A1* | 3/2012 | Jackowski | H04L 47/24 709/202 |
| 2012/0120797 | A1* | 5/2012 | Hahn | H04J 3/0632 370/230 |
| 2014/0208378 | A1* | 7/2014 | Emura | H04N 21/242 725/116 |

\* cited by examiner

SEAMLESS SOCIAL MULTIMEDIA

CROSS-REFERENCE TO RELATED PATENT APPLICATION

This application claims priority to a commonly owned U.S. Provisional Patent Application No. 62/651,660, filed on Apr. 2, 2018, titled "Seamless Social Media," which is herein incorporated by reference in its entirety.

BACKGROUND

Multimedia is ubiquitous. We are surrounded with different sources of still image, audio, and video content, and consume that content with a wide range of devices. Generally, multimedia is consumed via unidirectional communications, from a video server or other source, to a user-side receiving device configured to render the multimedia content.

Further, users also use multimedia to interact with one another via devices such as mobile phones and personal computers. Teleconferences, video conferences, text messaging, and shared images are just a few examples of how multimedia can be used as a communication medium. Generally, when users communicate, communications are bidirectional, meaning each user can both send and receive. In some cases, this communication is synchronous, where both users may receive and transmit in the same session. A voice call is an example of a synchronous communication. In other cases, this communication is asynchronous, where users interact with one another across multiple sessions. Blogging is an example of an asynchronous communication, since one user can post a message and a second user can read the post at a later point in time.

However, increasingly, the boundaries between directionalities (unidirectional, multicast, and bidirectional) and synchronizations (asynchronous and synchronous) are blurring. For example, it is not unusual for two different parties to be able to have their own means of broadcasting information, such as two individuals have their own microblogging (e.g. Twitter™) accounts, and reference each other's identities or topics in their posting. While it is not necessarily the case that all who follow microblogs also microblog, it is an increasing phenomenon. Similarly, as client devices receive notifications in near real-time of postings, different users may respond, using traditionally asynchronous communication methods, in a near synchronous fashion, such as in a texting (e.g. short message service (SMS)) conversation. Note that in the case of SMS, each message has its own communication session.

There is a proliferation of web applications which help manage this torrent of multimedia experiences by adding context to different communication threads, usually via social networking techniques. There are ways to share and post video both for consumption (e.g. YouTube™) and ways to share and comment video (e.g. Vine™) However, there remains a desire to seamlessly integrated social experience with a multimedia broadcast.

BRIEF DESCRIPTION OF THE DRAWINGS

The Detailed Description is set forth with reference to the accompanying figures.

DETAILED DESCRIPTION

Context of Seamless Social Multimedia

This disclosure describes techniques that implement seamless social multimedia. Specifically, a web service, called a social multimedia service, intervenes in a wide range of directionalities (unidirectional, multicast and bidirectional communications), and synchronizations (synchronous, semi-synchronous and asynchronous) for multimedia sources and services. Specifically, in intervening, the social multimedia service intercepts a multimedia stream, serves it to a user with or without another concurrent multimedia stream, performs transactions in the context of at least one multimedia stream, receives user generated content about at least one multimedia stream, and repackages for redistribution at least some subset of the multimedia experience aggregated from the different multimedia streams. For example, a user may be watching a television show at the same time as another user, commenting in real time, receiving response comments from the other user, performing an in-show purchase, and recording part of the experience for posting on a social site, all in the same user interface and via the social multimedia service.

This social multimedia service contemplates the notion of semi-synchronous communications. Semi-synchronous communications are communications that are generally not synchronized, but have a finite and potentially discontinuous set of synchronization points. Accordingly, semi-synchronous communications includes at least two streams of communications, that are asynchronous in between synchronization points, but at a synchronization point are made synchronous at that point. For example, a video stream and a text stream may be streamed together, and every 10 seconds, there is a synchronization point where the video stream and the text stream are guaranteed to correspond to the same point of time. In this way, the texts will never be more than 10 seconds out of sync with the video stream. Generally, the synchronization points are either defined by a content author or developer, but alternatively may be triggered by a programmatic event.

This disclosure further contemplates a social multimedia service that is configured to support multicasting. In some scenarios, such as video broadcasting, the same multimedia data stream may be routed to more than one user. In lieu of maintaining a unidirectional stream for each user with a server, the social multimedia service may provide unidirectional streams from a single point, so that if a server needs to modify a stream, it need only modify one multicast stream rather than multiple unidirectional streams.

Figure 1:
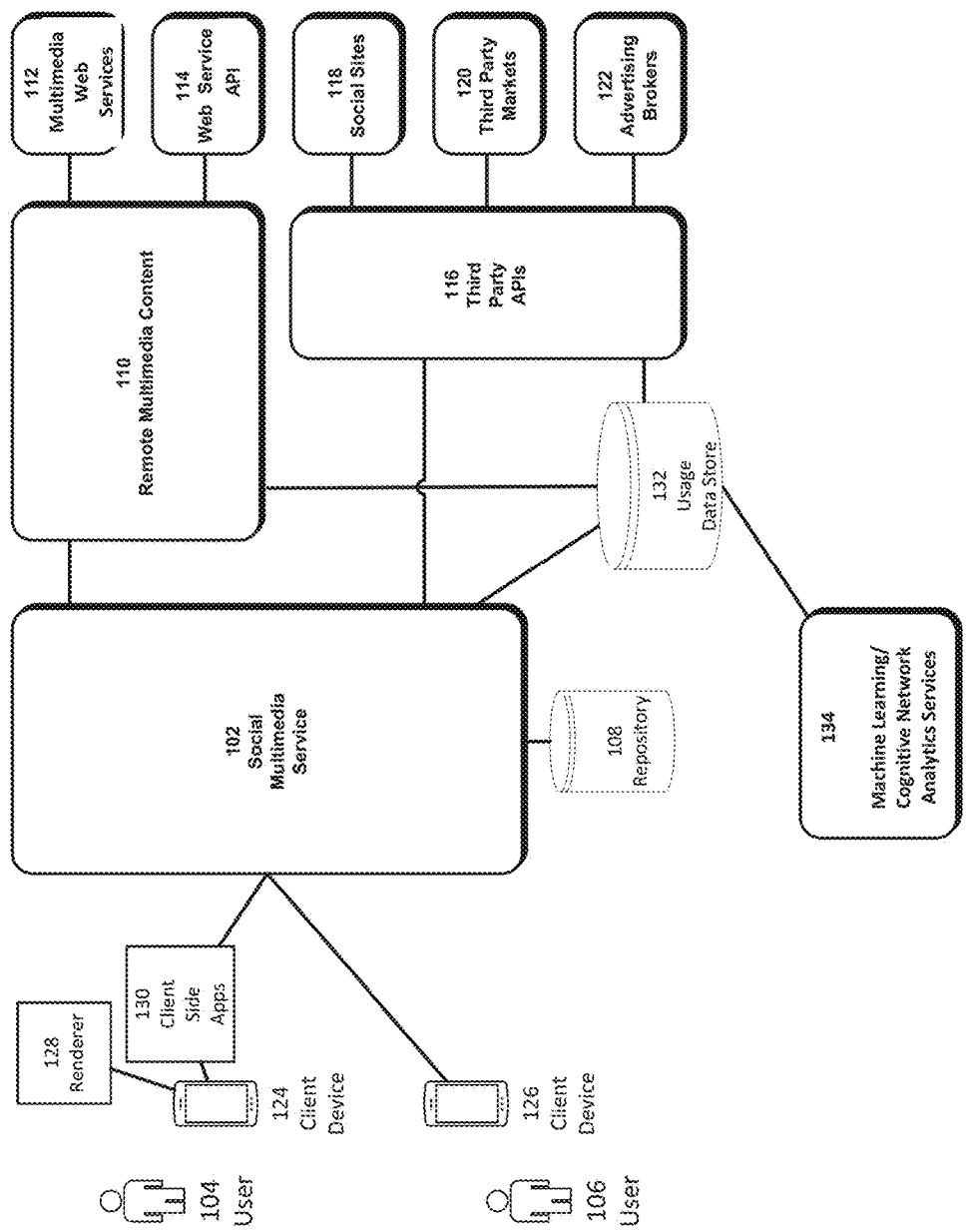
FIG. 1 is a top-level context diagram for seamless social multimedia.

FIG. 1 illustrates a context diagram of the social multimedia service, its corresponding client and its context.

A social multimedia service 102, acts to provide one or more subscribing users 104, 106 a unified experience of multiple sources of multimedia. Sources of multimedia may be actual multimedia files stored in a multimedia repository 108 or remotely elsewhere as accessed via a remote multimedia content service 110, with reference to their respective locations stored in repository 108. Generally, the repository 108 stores files or references to file locations that are traditionally unidirectional.

In some cases where the multimedia file is stored remotely, the multimedia file may be served from a multimedia streaming web service 112 mediated by a remote multimedia content service 110. The remote multimedia content service 110 manages requests from the social multimedia service 102 to ensure the received multimedia file is in a format and is synchronized (asynchronous, semi-synchronous or synchronous) as expected by the social multimedia service 102. In some cases, remote multimedia is accessible via a web services application programming interface (API) 114 for that service 112. In such case the remote multimedia content service 110 may mediate requests from the social multimedia service 102 to the web services API 114.

In general, the social multimedia service 102 also intervenes with a number of services via third-party APIs 116 to social network sites 118, third-party online markets 120 (also called online stores, but called markets herein to distinguish from data and file stores), and advertising brokers/servers 122. In this way, the social multimedia service 102 may receive texts (potentially via a web service API) which may be related to a television show in broadcast, stream advertising and may detect user response and behavior, and may execute in-show purchases. The architecture of the social multimedia service 102 is described in further detail with respect to FIG. 3 below.

Thus far, the description of the context 100 of the social multimedia service 102 has been that of the server-side. However, the social multimedia service 102 then creates relations between the various multimedia streams, either as directed by a user, or in response to a web service or other service surfacing a multimedia stream to a user 104, 106 via a client device 124, 126. A client device 124, 126 may be a mobile smart phone or a personal computer, or other computing device. The client device 124, 126 is able to receive directed multimedia streams, potentially interleaved by the social multimedia service 102 into a single multimedia stream, and to send user generated and other content back to the social multimedia service 102. The client device 124, 126 renders the received multimedia stream or interleaved multimedia stream in a rendering software component (renderer 128) and receives content from the user 104, 106 via one or more client-side applications 130 configured to work in concert with the renderer 128 and the social multimedia service 102. The architecture of the client device 124, 126 and associated software components, namely the renderer 128 and the client-side application 130, is described in further detail with respect to FIG. 3 below. Interleaving multimedia streams into a single multimedia stream is described in further detail with respect to FIG. 4 below.

Note that each user 104, 106 has their own respective client device 124, 126 respectively, and accordingly their own software components, namely a renderer 128 and client-side application 130. As each user 104, 106 participates in social multimedia via the social multimedia service 102, each user 104, 106 may customize which subset of multimedia streams to participate in and may customize the configuration of their software components, namely render 128 and client-side application 130, and accordingly their user experience. Customization is described in further detail with respect to the description of the social video server 102 architecture in FIG. 3, and with respect to the use case descriptions below.

Figure 2:
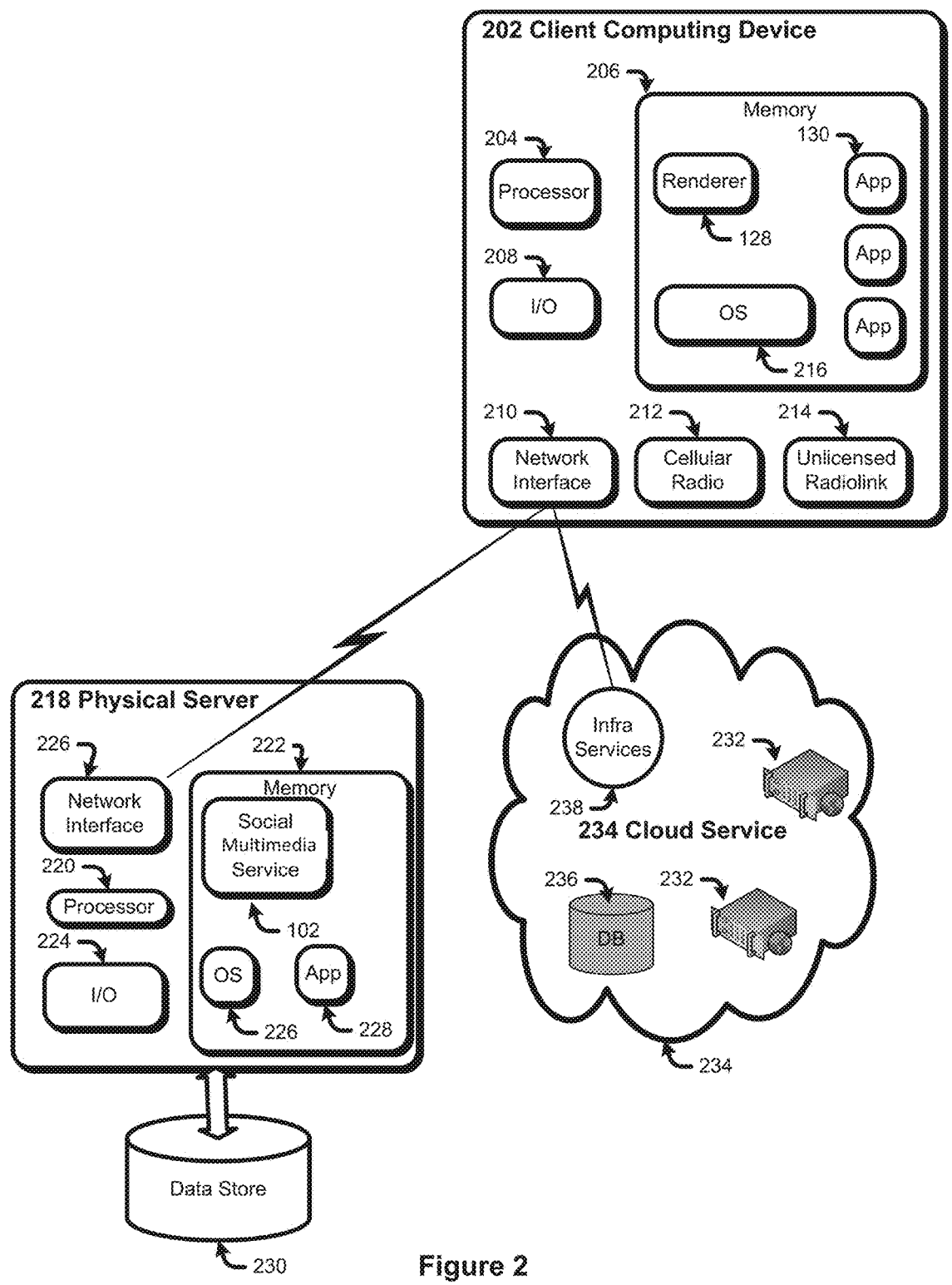
FIG. 2 is an exemplary environment diagram for seamless social multimedia.

The social multimedia server 102, by virtue of being central to receiving multimedia streams, and receiving responses from users 104, 106 on the multimedia streams is in a position to collect usage and behavioral data and to store such collected data in a data store 132. The collected data in data store 132 may then be subjected to big data analytics techniques. Specifically, collected usage and behavioral data in data store 132 may be analyzed via machine learning and/or cognitive network analytics software services 134. The resulting analysis may be used to guide the social multimedia service 102 operations for serving multimedia, or provided to third parties, such as multimedia surfacing services 112 and advertising brokers/servers 122 to surface multimedia, that is to guide selection of multimedia to serve.
Exemplary Hardware, Software and Communications Environment for Seamless Social Multimedia Seamless social multimedia is generally implemented via a social multimedia service 102, and software components, namely the renderer 128 and client-side application 130, running on a client device 124, 126. FIG. 2 is an exemplary environment diagram 200 describing the hardware, software and communications environment for seamless social multimedia.

The software components, namely the renderer 128 and client-side application 130, are generally hosted on a client device 124, 126 which may correspond to a client computing device 202. By way of example, the client computing device 202 includes without limitation personal computers, laptops, embedded devices, tablet computers, and smart phones. As the client computing device 202 accesses the social multimedia service 102, it is networked with other client computing devices.

The client computing device 202 has a processor 204 and a memory 206. The processor may be a central processing unit, an application processing unit, and/or a dedicated controller such as a microcontroller.

The client computing device 202 further includes an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208, and may be a network interface card supporting Ethernet and/or WiFi and/or any number of other physical and/or datalink protocols. On many client computing devices 202, such as with smart phones, the client computing device 202 is able to participate in both cellular and unlicensed wireless communications (e.g. WiFi). In this case the network interface 210 may work in concert with one or more radios for cellular 212 or unlicensed 214 communications.

Note that in general, memory 206 is any computer-readable media which may store several software components including an operating system 216 and software components such as the renderer 128 and client-side applications 130. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The social multimedia service 102 is generally hosted on a physical server, or on a virtual machine. Where the social multimedia service 102 is hosted on a physical server 218, the physical server 218 is any computing device that may participate in a network. The network may be, without limitation, a local area network ("LAN"), a virtual private network ("VPN"), a cellular network, or the Internet. The physical server 218 may be a computing device with sufficient I/O computing capacity to serve multiple clients. Specifically, the physical server 218 includes a processor 220, a memory 222, an input/output interface 224 and a network interface 226. In various examples, the processor 220 may be substantially similar to the processor 204, the memory 222 may be substantially similar to memory 206, the input/output interface 224 may be substantially similar to input/output interface 208, the network interface 226 may be substantially similar to network interface 210. Further, the memory 222 may include an operating system 226 and server-side software 228, such as the social multimedia service 102.

Alternatively, the social multimedia service 102 may be hosted on a virtual machine 232 via a cloud service 234. Specifically, the cloud service 234 may represent a plurality of disaggregated servers which provide virtual application server 232 functionality and virtual storage/database 236 functionality. The disaggregated servers are physical computer servers, which may have a processor, a memory, a I/O interface and/or a network interface. The features and variations of the processor, the memory, the I/O interface and the network interface are substantially similar to those described for the physical server 218. There may be differences where the disaggregated servers are optimized for throughput and/or for disaggregation. In addition to hosting the social multimedia service 102, machine learning/cognitive network software 134 (not shown) and other server-side software (not shown) may be hosted on virtual application servers 232.

The cloud service 234 may be made accessible via an integrated cloud infrastructure 238. Cloud infrastructure 238 not only provides access to cloud services 234 but also to billing services and other monetization services. Cloud infrastructure 238 may provide additional service abstractions such as Platform as a Service ("PAAS"), Infrastructure as a Service ("IAAS"), and Software as a Service ("SAAS").

Exemplary Architecture for Seamless Social Multimedia

Figure 3:
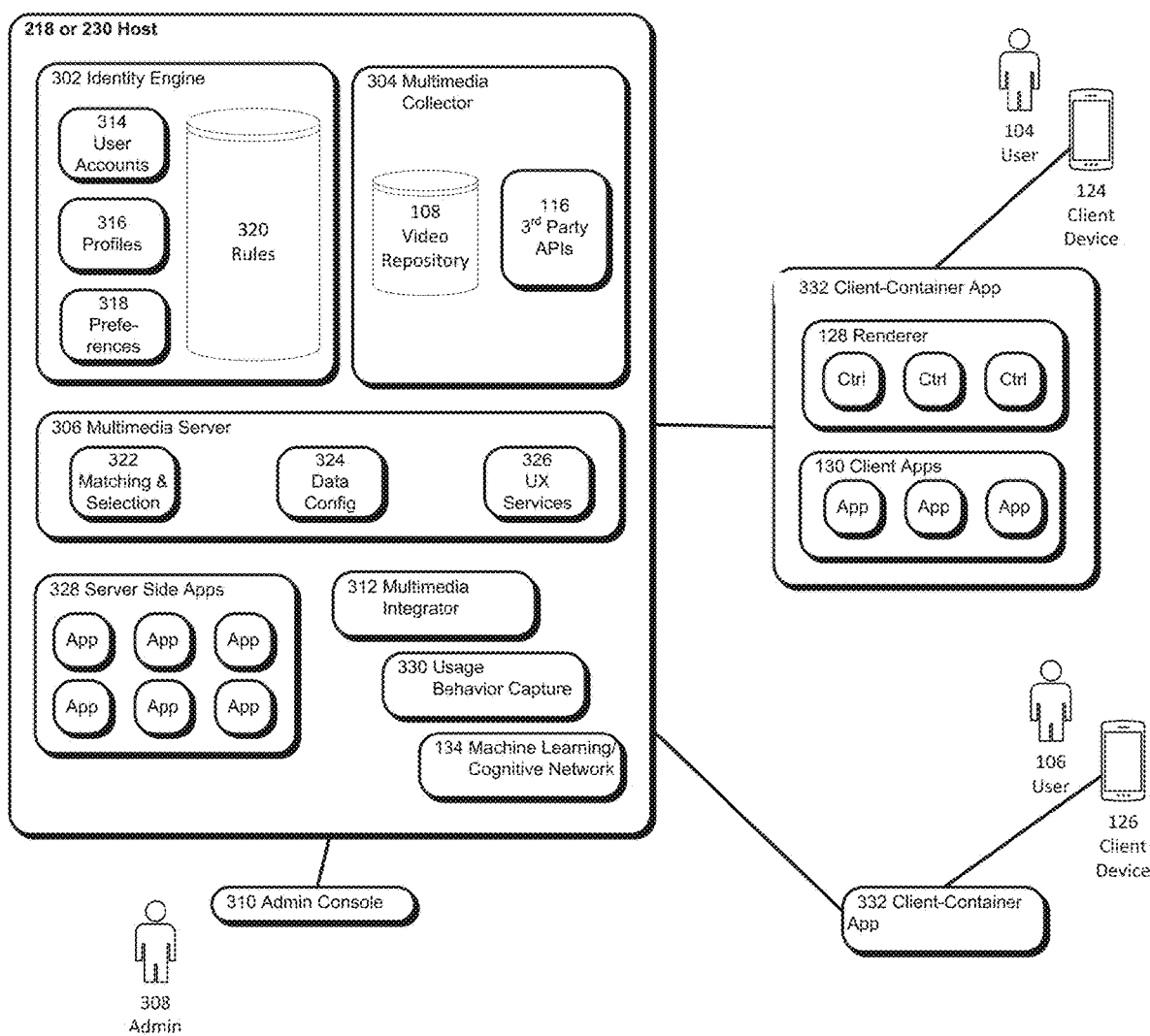
FIG. 3 is an exemplary systems diagram for seamless social multimedia.
Figure 4:
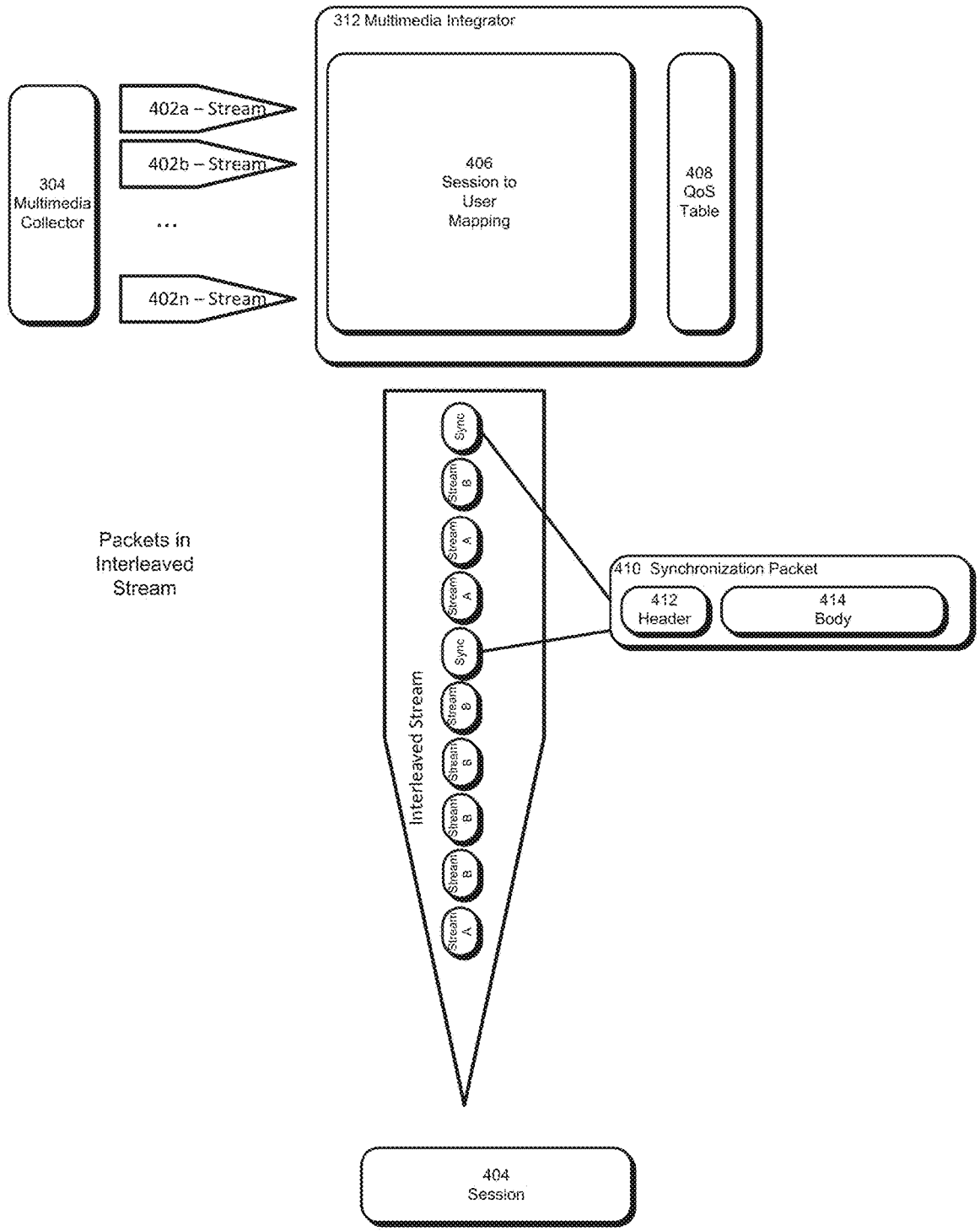
FIG. 4 is a diagram illustrating an exemplary interleaved multimedia stream.

Turning to the software implementation for seamless social multimedia, FIG. 3 is a block diagram 300 of the internals of the social media server 102, software components, namely the renderer 128, the client-side application 130, and environment software.

As described above, the social multimedia service 102 is hosted on a physical server 218 or a virtual machine running a virtual application server 232 on a cloud service 234. The social multimedia service 102 comprises several software components, including an identity engine 302 that stores and manages accounts for subscriber users 104, 106 to services provided by a social media service, such as social sites 118. Some of those services are described in greater detail with respect to the use case descriptions below. The social multimedia service 102 further includes a multimedia collector 304 which handles the functions of managing and retrieving multimedia streams. The multimedia server 306 is responsible for selecting a set of multimedia streams based on rules set by a user 104, 106 or an administrator 308 via administrator console 310, and then serving the multimedia streams to the users 104, 106 via client devices 124, 126.

In one embodiment, the social multimedia service 102 integrates the various selected multimedia streams into a single multimedia stream via a multimedia integrator 312. The operation of the multimedia integrator 312 is described in greater detail with respect to FIG. 4.

As stated above, the identity engine 302, stores account/login information for each user 104, 106 subscribing to services provided by the social multimedia service 102. User account information, and functions to secure account information including payment and identity information are performed via the user account manager 314. Users 104, 106 will have both profiles, which include demographic information and behavioral data and preferences, which store directives specifying services requested and the configurations of those services. Profile information is stored and managed by profile manager 316, and preferences are stored and managed in preference manager 318. The identity engine 302 converts account, profile and preference information into directives for the social multimedia server 102, in rules data store 320. In this way, the identity engine 302 may provide a store of information to the multimedia collector 304 and the multimedia server 306 as to what multimedia streams to surface and how to configure services.

The multimedia collector 304 is responsible for providing and managing multimedia files and services. It has access to the repository of multimedia files and references 108 and access to third-party web services via the third-party APIs 116. Based on directives from the rules data store 320, it selects multimedia streams and attaches metadata in the form of tags or packet fields for multimedia streams, resulting in a configured set of metadata streams to be provided to a particular user for a particular session. In fact, in this state, the multimedia streams could be served to a user.

The multimedia server 306 manages sessions by users 104, 106. Specifically, a user 104, 106 logs onto the server creating a session. The multimedia server 306 invokes the matching and selecting engine 322 which in turn accesses the rules data store 320 for that user 104, 106. The matching and selecting engine 322 retrieves multimedia streams for the user 104, 106 for the user's session from the multimedia collector 104 and performs final configurations. First a data configuration engine 324 performs server-side multimedia stream configuration. Activities include setting quality of service, throttling bandwidth, encryption and compression. The data configuration engine 324 may opt to use the multimedia integrator 312 to interleave at least some of the multimedia streams retrieved from the multimedia collector 304 into a single multimedia stream. The multimedia integrator 312 is described in greater detail with respect to FIG. 4.

Second a user experience services engine 326 embeds client-side directives including skinning information, and client-side customization directives. Both processes are described in greater detail with respect to FIG. 6 below. Once the user experience service engine 326 finishes embedding client-side directives, the multimedia server 306 serves the multimedia stream or streams to the user 104, 106.

The multimedia server 306 itself is a platform. Specifically, it has an API set that allows developers to create server-side applications 328 that use the services of the social multimedia server 102. Example applications include a local market that enables in video/multimedia stream purchases. Alternatively, an application may delegate to other online markets for in video/multimedia stream purchases as well. An application may direct the multimedia server 306 to configure streams and serve metadata for specific user experience. Some server-side applications 328 may perform transformation on the data payloads in the data streams themselves. Examples include server-side object recognition, optical character recognition (OCR), and on the fly language translation. Ordinarily, performing object recognition, OCR, and language translation is processor intensive. However, by performing these activities on the server-side, cloud resources may elastically scale to provide real time and near real-time performance. Also note that the social video service 102 may engage in repacketizing streams—receiving data, opening up payloads, performing transformations on the data, and then creating a new packet stream on the transformed data. This is possible because the social video server 102 intervenes in the connection between two client devices 124, 126 and multimedia content 110, 112. Some of these applications are described in greater detail with respect to the use cases section below.

The multimedia server 306 exposes data and events that may be captured by a usage and behavior capture component 330. The usage and behavior capture component 330 integrate with machine learning/cognitive network platforms to perform analysis on the collected data and events. The analysis may then be used to provide feedback to third-party web services via the third-party APIs 116.

The user 104, 106 will have a client device 124, 126 which has a social multimedia client application, namely the client-container application 332. The container application 332 includes a renderer 128, and a plurality of client application(s) 130a-n. The client-container application 332 is the application that logs onto the multimedia server 306 and initiates a communications session. The client-container application 332 also supports receiving from and sharing data with other client-container applications 332 of other users 104, 106. Specifically, if user 104 on client device 124 has a session running on its client-container application 332, a second user 106 on their client device 126 may also run a remote session on the first user's client application. In this way, the two users 104, 106 may have a collaborative session.

The client-container application 332 may act as a container application to host client applications 130a-n. Specifically, the client applications 130a-n may plug into the client-container application 332 which in turn enable controls and user experiences specific to the applications 130a-n. In some embodiments, the client-container application 332 may act similarly to a model-view-controller (MVC) platform where the incoming multimedia stream or streams corresponds to the MVC model, the renderer shared, or otherwise, corresponds to the MVC view, and the applications enable menu option and widgets correspond to MVC controllers. Thus, the applications, along with any configuration metadata from the multimedia server 306, may customize the user experience of the client-container application 332.

A wide variety of applications 130a-n are enabled with this configuration. Examples include internet messaging, setting up preferred groups, and video conferencing. These use cases are described in more detail with respect to the section for use cases below.

Exemplary Multimedia Stream Interleaving

As stated above the multimedia server 306 may stream one or more multimedia streams. To provide substantively real-time streaming, the one or more multimedia streams are to be synchronized. In some embodiments, the multimedia streams are from over-the-top applications, that is applications that participate in the session, application and presentation network layers (of the OSI stack). Accordingly, the streams are fully packetized on a per session basis.

However, the sessions for each media stream are sessions for each respective streaming service, rather than for the multimedia server 306. To synchronize the media streams, the multimedia server 306 stores a mapping of each session for each respective streaming service to a user session on the multimedia server. It tracks the rate of streaming for each media stream, and where a media stream falls behind the other media streams, the multimedia server 306 may drop packets of faster streams. In this way, the laggard media stream may catch up.

This technique works best for unidirectional streams. For example, a video stream and a commentary feed may result in video stream packets being dropped to ensure the commentary feed stays up to date with the video stream. Accordingly, this technique is a tradeoff between quality of service and synchronization.

However, where there is a bidirectional stream, or a data sensitive stream, dropping packets may not be appropriate. In particular, a media stream capturing a payment transaction for an in video/multimedia stream purchase would buffer a transactional failure where packets are dropped, especially if waiting on human interaction. Similarly, session initialization and security checks are likely to fail if critical packets are dropped by the multimedia server 306.

Accordingly, in some embodiments, the multimedia streams may be synchronized by being affirmatively interleaved. Multimedia stream interleaving is illustrated in diagram 400 of FIG. 4.

A multimedia integrator 312 receives a plurality of media streams 402a-n from the multimedia collector 304 as forwarded by the multimedia server 306. As with the packet dropping scenario described above, the multimedia integrator 312 keeps a session to user mapping 406 of the sessions of the media streams 402a-n with respect to a session 404 for a user of the multimedia server 306. Furthermore, the multimedia integrator 312 keeps an application quality of service (QoS) lookup table 408 indicating which multimedia stream sources are sensitive to packet dropping. Specifically, the QoS lookup table 408 indicates which sessions are unidirectional or bidirectional, and which sessions are asynchronous or synchronous, and indicates a maximum percentage threshold that packets may be dropped. Where packets cannot be dropped, the percentage threshold may be set to zero.

The multimedia integrator 312 generates a synchronization packet 410 comprised of a synchronization packet header 412 and a synchronization packet body 414. The synchronization packet header 412 contains the session information for the user's multimedia server session 404.

The synchronization packet body 414 may store QoS thresholds for streams comprising the interleaved stream.

The multimedia integrator 312 then identifies which stream out of the plurality of streams 402*a*-*n* require a resending of packets, and then identifies a quota of packets for each stream 402*a*-*n* to be sent to a client. The sum of the packets to be resent and the quotas of the packet stream are to be less than the maximum packet references that may be stored in the synchronization packet body 414.

For streams 402*a*-*n* requiring a resending of packets, those packets are referenced in the synchronization packet body 414. Then the multimedia integrator 312 then populates the synchronization packet body 414 up to the packet stream quota. The multimedia integrator 312 implements the minimum packet drops for streams supporting packet dropping while maximizing packets placed into the interleaved stream up to the quota of packets for the streams not supporting packet dropping.

Note that where the multimedia integrator 312 has access to a QoS directive, the multimedia integrator 312 can throttle the number of packets, and can send directives to the source of the streams 402*a*-*n*, as needed to satisfy that QoS directive.

When the synchronization packet body 414 is populated, the multimedia server 306 then transmits the synchronization packet 410 and the packets of the multimedia streams 402*a*-*n* as specified by the synchronization packet 410.

The client-container application 332 receives the synchronization packet 410 and at least some of the packets of the multimedia streams 402*a*-*n* as specified by the synchronization packet 410. The packets are buffered. Note that it is possible that not all packets arrive. Where received packets are incomplete and are from streams corresponding to applications not supporting packet dropping, the client-container application 332 sends a request to retransmit to the multimedia server 306. Otherwise, the packets are rendered by the renderer 128 as informed by client-side applications and application controllers 334.

In the meantime, the multimedia server 306 repeats the process for the next synchronization packet 410.

Exemplary User Interface for Seamless Social Multimedia

Figure 5:
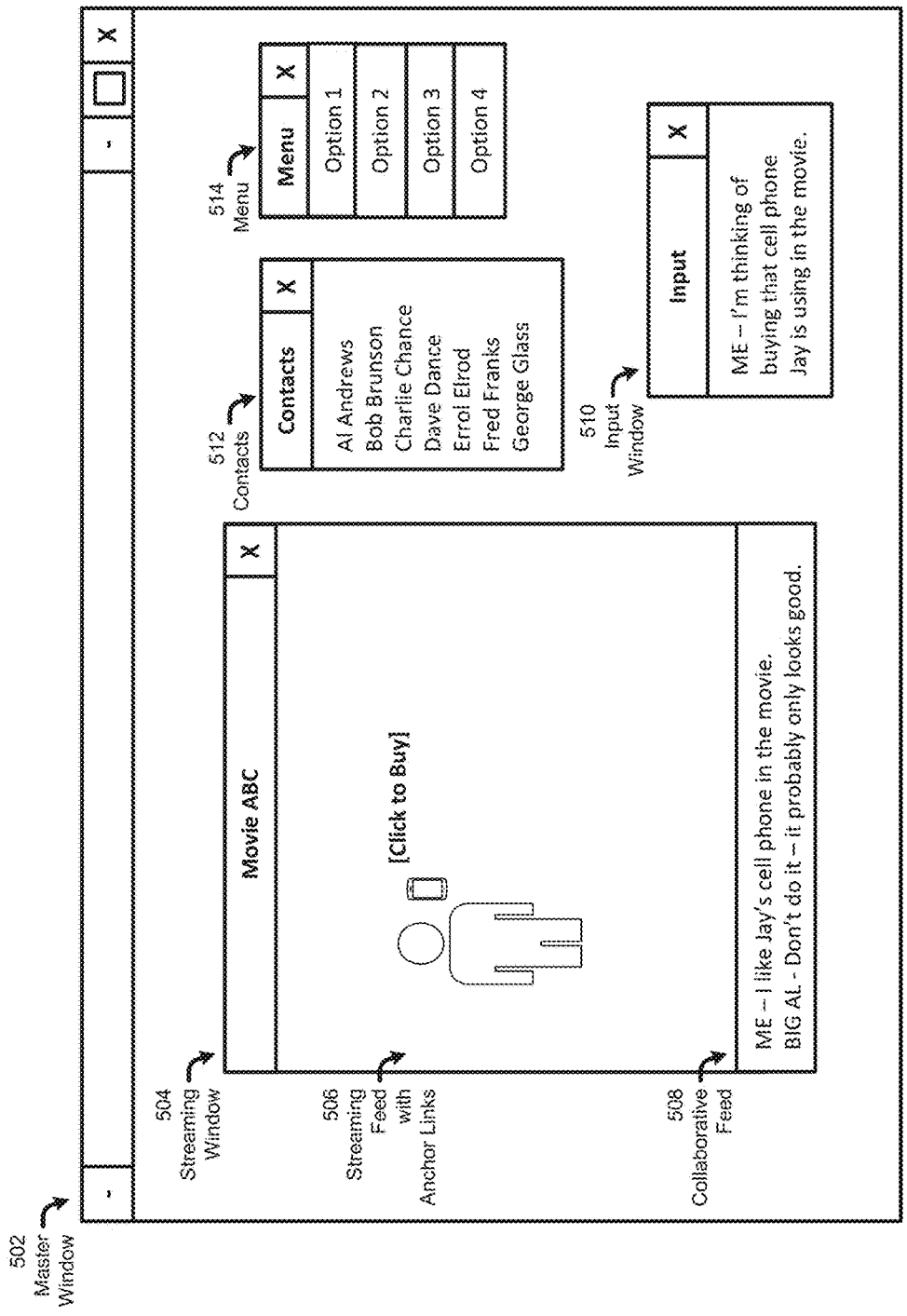
FIG. 5 is a representative user interface for seamless social multimedia.

Once the client-container application 332 receives the one or more streams 402*a*-*n*, either interleaved or separately, the client-container application 332 buffers and then renders the received streams 402*a*-*n* according to the local client applications 334. FIG. 5 is an exemplary user interface 500 illustrating synchronous, semi-synchronous and asynchronous communication, and unidirectional, multicast and bidirectional streams.

Container application 332 may display a master window 502 corresponding to the application's operating system process. The master window 502 may contain a window 504 corresponding to a unidirectional or multicast stream 506, such as a television show. In the same window, there may be a series of collaborative streams in a feed 508, such as real-time commentary from multiple viewers.

The unidirectional or multicast stream 506 may contain active anchor links such as an anchor link to enable an in video/multimedia stream purchase. In some embodiments, the purchase may be done in the same window 504. In other embodiments, a separate asynchronous window (not shown) may be created to perform the purchase.

Bidirectional streams are also supported. A separate window 510 may be displayed to provide text input for commentary that may be added to feed 508. A contacts list 512 and a menu of functions 514 may be visible in a separate window that may be hidden.

There are many variations of user interfaces that may be created for seamless social multimedia. Specifically, the container application 332 supports asynchronous, semi-synchronous and synchronous streams, unidirectional, multicast and bidirectional streams, and can display controls for input, displaying feeds, receiving menu commands, and tracking contacts. These user interface features may be configured by the user and alternative may be configured by client-side applications 334. This list of user interface features is merely exemplary and is not intended to be comprehensive.

Exemplary Method for Serving Social Multimedia Seamlessly

Figure 6:
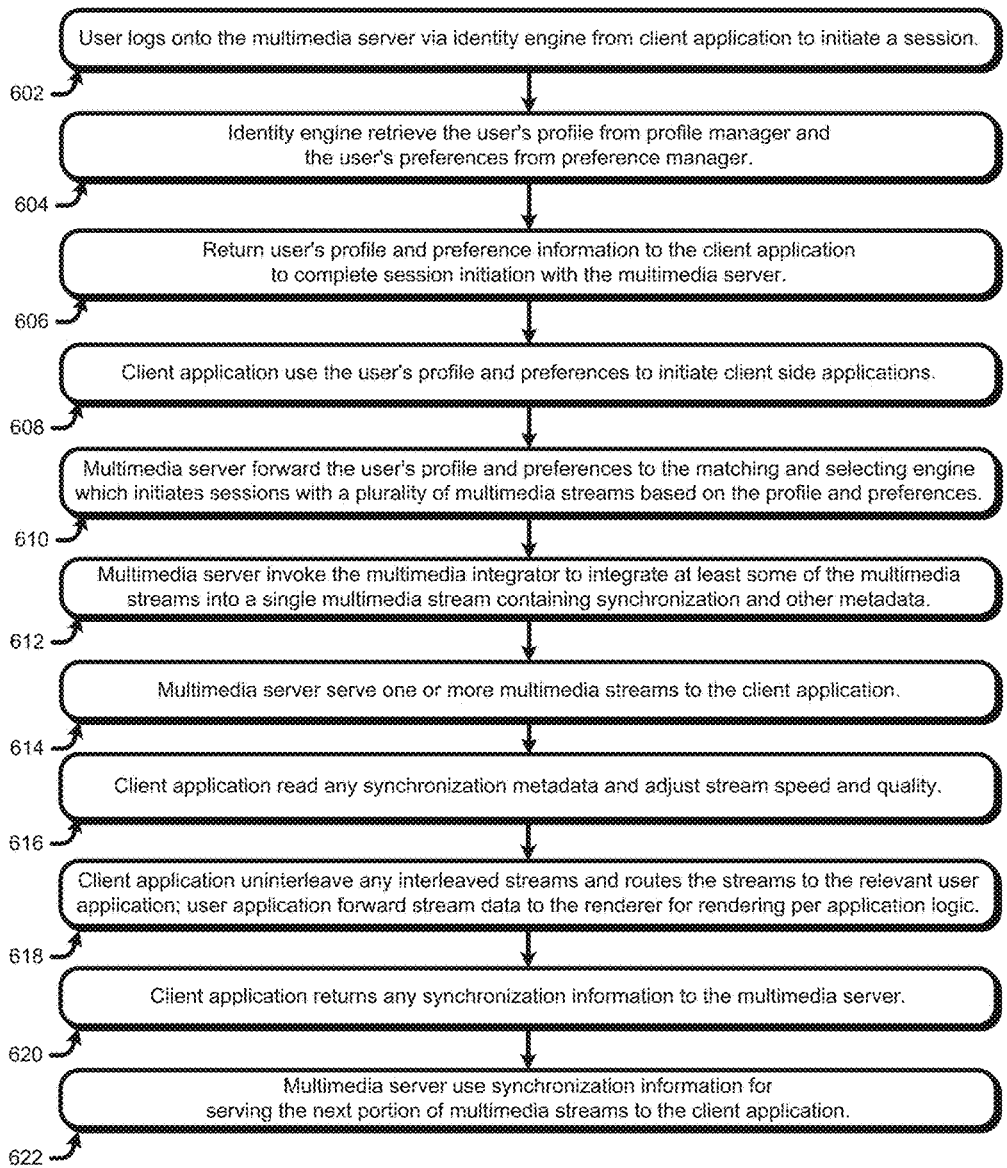
FIG. 6 is a flow chart for serving social multimedia seamlessly.

The process to server social multimedia seamless includes logging in to initiate a session, initializing a client application, initializing multimedia streams to be served, serving the multimedia streams and rendering the multimedia streams in the client application. FIG. 6 is flow chart 600 of an exemplary method to serve social multimedia seamlessly.

In block 602, a user 104, 106 logs onto the multimedia server 306 via identity engine 302 from client-container application 332 to initiate a session. Once the session is initiated, in block 604, the identity engine 302, retrieves the user's profile from profile manager 316 and the user's preferences from preference manager 318. Recall that the user profile relates to demographic and other metadata about the user, and user preferences relates to application and stream configuration data.

In block 606, the user's profile and preference information is returned to the client-container application 332 to complete the multimedia server 306 portion of the session initiation with the user. At this point, the multimedia server 306 may independently start selecting multimedia streams. Specifically, in block 610, the multimedia server 306 forwards the user's profile and preferences to the matching and selecting engine 322 which initiates sessions with a plurality of multimedia streams based on the profile and preferences.

In block 612, if necessary, the multimedia server 306 invokes the multimedia integrator 612 to integrate at least some of the multimedia streams into a single multimedia stream containing synchronization and other metadata as described above with respect to FIG. 4. The multimedia server 306, in block 614, serves one or more multimedia streams to the client-container application 332 depending on whether the multimedia integrator 612 integrated all, some or none of the selected multimedia streams.

In the meantime, and substantively independent of the multimedia server 306, in block 616, the client-container application 332 makes use of the user's profile and preferences to initiate client applications 130*a*-*n*.

In block 618, the client-container application 332 reads any synchronization metadata used to adjust stream speed and quality. In block 620, the client-container application 332 deinterleaves any interleaved streams and routes the streams to the relevant client applications 130*a*-*n*. At this point, the client-container application 332 may use the received synchronization data to throttle the streams based on whether the streams are synchronous versus semi-synchronous versus asynchronous and unidirectional versus multicast versus bidirectional. Techniques may include packet dropping, reducing quality of service, and the like. Upon receiving the data packets for their respective streams, the client applications 130*a*-*n* forward stream data to the renderer 128 for rendering per application logic.

After rendering, in block 620, the client-container application 332 returns any synchronization information to the multimedia server 306. The multimedia server uses this information in block 622 for serving the next portion of multimedia streams to the client-container application 332.

Exemplary Use Cases

The methods and systems described above enable the integration of various multimedia streams regardless if they are unidirectional or multicast or bidirectional and regardless if they are asynchronous, semi-synchronous or synchronous. Because of this capability, many use cases to use different streaming applications in concert are enabled. The following describe, without limitation, some exemplary use cases.

1. Social Integration and VoIP with Live Television

Live television streams are unidirectional or multicast streams. Presently, users 104, 106 may watch the same show at the same time, and send each other user generated comments, such as text messages, and post memes to microblogs, such as Twitter™. Seamless social media methods and techniques may be used to integrate the unidirectional or multicast live television stream, stream from multiple short message system (SMS) text feeds of the respective users 104, 106, and a reader generated by at least one Twitter™ account of the respective users 104, 106. Additionally, users 104, 106 may from time to time make Voice over IP (VoIP) calls to each other or in a group, VoIP calls constituting bidirectional and synchronous communications.

Note that the third-party API layer 114 enables interfacing with outside data such as SMS and social sites 118. The API layer 114 not only retrieves data from outside data feeds, but it supports both push architectures (e.g. SMS data being pushed to a subscriber), and pull architectures (e.g. the third-party API layer 114 receiving a notification that a tweet has been posted on Twitter™), but also can render the various data feeds as a multimedia stream. These streams may then be accessed by the multimedia collector 304.

Further note that the multimedia integrator 312 may interleave the television stream, VoIP call streams, and the SMS stream and the Twitter™ feed into a single interleaved stream thereby managing synchronization and data quality, regardless if the streams are unidirectional or multicast (television stream), bidirectional (SMS and Twitter™ including user comments to tweets as well as VoIP), synchronous (television stream and VoIP) or asynchronous (SMS and Twitter™).

Note that during server-side processing, server-side applications 328 may be used to perform data payload transformations. In one embodiment, SMS streams may be opened on the server-side, natural language translation (e.g. English to Korean) may be performed, and then converted back to an SMS stream and sent to the multimedia integrator 312 for interleaving and subsequent routing In another embodiment, during server-side processing, server-side applications 328 may be used to perform either object recognition or optical character recognition. Where video streams do not carry metadata indicating objects of interest or text transcriptions in the video frames, a server-side application 328 may render the data in the video stream, apply object recognition or optical character recognition, and generate the metadata indicating objects of interest or text transcriptions on the fly. The metadata is then interleaved into the data, and the data repacketized. The metadata may then be used on the client-side to provide the basis for hot spots in a video for in video purchase, or other scenarios. Also note that server-side applications 328 may perform multiple transformations on the data payloads in video and other multimedia streams. For example, OCR may be applied by a first server-side application 328(1) to obtain text transcriptions, and then a second server-side application 328(2) may then perform natural language translation on the transcription, prior to repacketization.

Moreover, note that client applications 130*a-n* may seek to render the received interleaved stream in a customized fashion. For example, the television stream may be shown to a larger window, the SMS feed and tweets may be integrated into a scrolling feed along the bottom of the same window, VoIP may be forwarded for streaming to a mobile phone via a Wi-Fi connection. Additionally, controls may be displayed the enable the user the halt the scrolling, and click on hyperlinks that open other windows or alternatively picture in picture of tweeted memes. Other controls may allow a user 104, 106 to participate in a VoIP call, add other users, or to disconnect from a VoIP call.

The client applications 130*a-n* need not rely solely on data within the interleaved stream. For example, the client-side application may feature a set of preferred contacts, made available by user preferences from the preferences manager 318. The user interface may have a fast lookup where preselected users may be surfaced in the user interface enabling the user to quickly locate and integrate into their user experience for example via SMS or alternatively a VoIP call. Selections may be sent back to the multimedia server 306 to enable invocations to the multimedia collector 304 to call the third-party API 114 to subscribe to the corresponding user SMS feeds and tweets.

2. In-Stream Purchase

Another use case enabled by seamless social multimedia integration are improved in multimedia stream/video purchases. When rendering a multimedia stream such as a live television stream, the stream is synchronous. However, initiating a purchase is asynchronous. Therefore, if the multimedia server 306 stream is interleaving links to enable hyperlinks for purchase in the television stream, the aforementioned methods and systems for seamless social multimedia enable a user to purchase without worry that the show will continue, and that the user will miss contextual details regarding the product in question.

The client-container application 332 may be configured to show a television show and receive user commands to pause the show to access an object in a frame for potential purchase. Alternatively, the client application may receive a click from a user 104, 106 to select an object for purchase and will automatically pause the show. Links may be made available by selecting objects or alternatively providing hyperlinks on a scrolling feed at the bottom of the screen. Although the show is live, the client-container application 332 may use a client application 130*a-n* to buffer the live television to give the appearance of pausing.

When a hyperlink to initiate a purchase is selected, a web page to either a local market or a third-party market available via third-party API 120 may be initiated. The web page may be in a separate window, or alternatively may be displayed as a picture in picture on the same display window as the television stream. The latter option may be desirable as to enable the user 104, 106 to view the video for context to aid in the decision whether or not to buy. After a purchase is made, or alternatively cancelled, the television stream may continue from the pause point.

Note that because the multimedia streams for both the television (unidirectional/multicast and synchronous) and the purchase session (bidirectional and asynchronous) are interleaved and in the same multimedia server 306 session, the television and purchase user experienced may be rendered in either the same window or different window.

Furthermore, purchase links may be rendered per user preferences either with the objects in the television stream itself, or alternatively in a scrolling feed. This is another example of how user preferences may customize the integrated user experience.

Also consider the case where the television stream is concurrently being watched with other users 104, 106. The user 104, 106 may desire to configure the client-container application 332 to not pause the television stream as to stay in sync with the other users 104, 106. In effect, we are configuring the television stream to not enable pauses. Furthermore, when a purchase is being consider or is made, information about such activity may be auto posted to a scrolling news feed. In this way, other users 104, 106 may discuss with the purchasing user 104, 106 whether to make the purchase, or to otherwise comment.

In this way, purchasing is not only integrated with the television stream, the activity around purchase may be shared and discussed in a social media setting.

3. Same Window Video Conferencing

The previous exemplary use cases describe sharing tweets and text messages which are architected to be asynchronous communication. However, video conferencing is architected to be synchronous communication. Where there are pauses in communication where no data is transferred during SMS text, data is always being transferred during a video conference. There are advantages to interleaving video conference data streams with other multimedia streams.

It is often desirable to see a video conference picture in picture. For example, in meetings, both business and social, participants may wish to see the reactions and expressions on faces of other participants. If the window switches between for example a document or television feed, the user 104, 106 is to make a choice between seeing the feed or the expression. By interleaving the multimedia streams for both television and video conferencing, both may be seen simultaneously.

Also, users 104, 106 may desire sidebar conversations with some, but not all other users in the conference. For example, in a negotiation, users for one party may wish to conceal their communications with the users from another party. Alternatively, users may simply wish to have a sidebar conversation which they know the others will have no interest.

Note that the interleaving of both television and video conferencing, where both streams are managed by a multimedia server 306 session, enables the choice of whether the television and video multimedia streams are shown in the same window or different windows, and are synchronized with each other.

Further note that asynchronous communications, such as SMS text is also enabled by the multimedia servers 306 capability of interleaving synchronous/semi-synchronous/asynchronous and unidirectional/multicast/bidirectional streams. In the case of client-container applications 332 sending over user directives, the multimedia server 306 can apply logic to selectively interleave SMS texts for some users but not others.

4. Comprehensive Usage/Behavior Modeling Via Machine Learning

The seamless social media integration as described above, enables a new class of user experiences in common. Because all of these experiences are being managed by the multimedia server 306, usage and behavior patterns may be stored in usage data store 132 and machine learning techniques 134 applied.

Presently, the user behavior is tracked by viewing choices and ultimate via user clicks. However, with the integration techniques and systems described above, patterns may be corroborated by feedback on a user by virtue of texting, tweeting, and other communication with others in a social setting. Accordingly, conclusions about a user may be made with higher confidence.

This information may be made in two ways. One may be with respect to the quality of service received on data streams. For example, if multiple users are complaining about stream quality in a text feed to the point that they may change the multimedia stream (i.e. change the channel), the multimedia server 306 may use machine learning feedback to accordingly change the quality of service.

This information may also be shared, in privacy protected form where data is either anonymized or aggregated in compliance with privacy law, with advertisers. For example, at any one time, there may be more different hyperlinks for in-video/in multimedia stream available than can be fit on a television frame. The most likely hyperlinks of interest may be surfaced to a user.

5. Cultural Customization

Social media experiences may transcend borders. For example, users in different countries may be watching the FIFA World Cup, or the Olympics at the same time. It is common to have friends and family resident in different countries, or even just visiting. Accordingly, it may be desirable to have cultural friendly user preferences available via the preferences manager 318.

Preferences may come in the form of application preferences, rendering preferences, and user interaction preferences. In the case of application preferences, note that a user in China may not have access to Google. Accordingly, if there is a stream that is being played on Google Play, the multimedia server 306 may find a separate site showing the same content, on an analogous server in China. Furthermore, the multimedia server 306 may synchronize the two different streams so that a user in China and a user in the U.S. may view substantially the same event together in sync.

In the case of rendering preferences, note that the client application 130a-n may render text on the same screen. Some languages read left to right, others from right to left, and yet others up and down. Not only can the multimedia server 306 stream on the fly translations, it may render the translations in the preferred orientation (e.g. left to right, etc.) for that language.

Finally, in the case of user interaction preferences, note that the machine learning algorithms 134 are collecting user usage data into usage data store 132. Because the multimedia server 306 is aware of the locales of the various users 104, 106, the machine learning algorithms 134 may cluster behavior analysis to those locales. In this way, user interaction patterns may be discerned and surfaced to users on a per locale, and accordingly culturally aware, basis.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for interleaving multiple multimedia streams into a single interleaved stream, comprising:
receiving, at a social multimedia server, a multimedia request comprised of a first multimedia stream comprised of a first sequence of packets and associated with a first communications session, and a second multimedia stream comprised of a second sequence of packets and associated with a second communications session;
determining a first quality of service (QoS) threshold and a first packet dropping sensitivity indicator of the first multimedia stream and a second QoS threshold and a second packet dropping sensitivity indicator of the second multimedia stream;
selecting, from the first multimedia stream, a first number of packets from the first sequence of packets and placing the selected packets from the first multimedia stream into an interleaved stream;
selecting, from the second multimedia stream, a second number of packets from the second sequence of packets and placing the selected packets from the second multimedia stream into the interleaved stream;
creating a synchronization packet that includes the first QoS threshold, the first packet dropping sensitivity indicator, the second QoS threshold, and the second packet dropping sensitivity indicator, and placing the synchronization packet the interleaved stream; and
transmitting the interleaved stream that includes the synchronization packet that includes the first QoS threshold, the first packet dropping sensitivity indicator, the second QoS threshold, and the second packet dropping sensitivity indicator over a third communications session.

2. The method of claim 1, wherein the first multimedia stream and the second multimedia stream each have any one of the following directionalities: unidirectional, multicast or bidirectional multimedia stream; and the first multimedia stream and the second multimedia stream have different directionalities.

3. The method of claim 1, wherein the first multimedia stream and the second multimedia stream each have any one of the following synchronizations: asynchronous, semi-synchronous or synchronous; and the first multimedia stream and the second multimedia stream have different synchronizations.

4. The method of claim 1, wherein the social multimedia server stores a quality of service (QoS) table specifying the first QoS threshold for the first multimedia stream and the second QoS threshold for the second multimedia stream; and wherein either the first number of packets from the first sequence of packets, or the second number of packets from the second sequence of packets, or both, placed into the interleaved stream are based at least on a respective first or second QoS threshold in the QoS table.

5. The method of claim 4, wherein the second multimedia stream is faster than the first multimedia stream, and the method further comprises dropping packets from the second multimedia stream to enable the first multimedia stream to catch up with the second multimedia stream, wherein a third number of packets dropped from the second multimedia stream is based at least on the second QoS threshold of the second multimedia stream.

6. The method of claim 5, wherein the QoS table stores an indicator as to whether a multimedia stream is sensitive to packet dropping, and wherein the packets are dropped from the second multimedia stream if the second multimedia stream is not associated with an indicator that it is sensitive to packet dropping.

7. The method of claim 5 comprising:
receiving, at a social multimedia server over a user session, QoS data about the first multimedia stream; and
modifying the first QoS threshold of the first multimedia stream based at least on the received QoS data.

8. The method of claim 1, wherein the synchronization packet stores information about the third communications session.

9. A method for rendering in a single user interface a plurality of multimedia streams interleaved into a single multimedia stream, comprising:
receiving, at a client container application over a user communications session, a single interleaved multimedia stream comprised of a first set of packets from a first multimedia stream, a second set of packets from a second multimedia stream, and a synchronization packet that includes a first quality of service (QoS) threshold of the first multimedia stream, a first packet dropping sensitivity indicator of the first multimedia stream, a second QoS threshold of the second multimedia stream, and a second packet dropping sensitivity indicator of the second multimedia stream, wherein the first multimedia stream is a unidirectional or multicast stream and the second multimedia stream is a bidirectional stream;
separating the first set of packets apart from the second set of packets in the single interleaved multimedia stream up to the synchronization packet; and
rendering the separated first set of packets in a first client application contained in the client container application and rendering the separated second set of packets in a second client application contained in the client container application.

10. The method of claim 9, wherein a communications session for the first multimedia stream, a communications session for the second multimedia stream, and the user communications session are different from each other.

11. The method of claim 10, wherein the first multimedia stream is a video stream and the second multimedia stream is a chat stream.

12. The method of claim 11, wherein a chat over the chat stream may be initiated via a single user interface gesture corresponding to selecting a contact to chat with via a list of contacts.

13. The method of claim 11, wherein the video stream has an in-session purchase anchor link embedded in the video of the video stream;
the method comprising:
receiving from the first client application an activation of the embedded in-session purchase anchor link; and
initiating a separate session to an electronic market corresponding to the in-session purchase anchor link.

14. The method of claim 13 comprising:
sending an indicator over the communications session of the second multimedia stream that the embedded in-session purchase anchor link has been activated.

15. The method of claim 9, further comprising determining whether the second multimedia stream is faster than the first multimedia stream, and dropping packets from the second multimedia stream based on the QoS threshold of the second multimedia stream as to allow the first multimedia stream to catch up.

16. The method of claim 15, further comprising only dropping packets if the second multimedia stream is not indicated to be sensitive to packet dropping.

17. A system, comprising:
- one or more processors; and
- memory including a plurality of computer-executable components that are executable by the one or more processors to perform a plurality of actions, the plurality of actions comprising:
  - receiving, at a social multimedia server, a multimedia request comprised of a first multimedia stream comprised of a first sequence of packets and associated with a first communications session, and a second multimedia stream comprised of a second sequence of packets and associated with a second communications session;
  - determining a first quality of service (QoS) threshold and a first packet dropping sensitivity indicator of the first multimedia stream and a second QoS threshold and a second packet dropping sensitivity indicator of the second multimedia stream;
  - selecting, from the first multimedia stream, a first number of packets from the first sequence of packets and placing the selected packets from the first multimedia stream into an interleaved stream;
  - selecting, from the second multimedia stream, a second number of packets from the second sequence of packets and placing the selected packets from the second multimedia stream into the interleaved stream;
  - creating a synchronization packet that includes the first QoS threshold, the first packet dropping sensitivity indicator, the second QoS threshold, and the second packet dropping sensitivity indicator, and placing the synchronization packet the interleaved stream; and
  - transmitting the interleaved stream that includes the synchronization packet that includes the first QoS threshold, the first packet dropping sensitivity indicator, the second QoS threshold, and the second packet dropping sensitivity indicator over a third communications session.

18. The system of claim 17, wherein:
- the first multimedia stream and the second multimedia stream each have any one of the following directionalities: unidirectional, multicast, or bidirectional multimedia stream,
- the first multimedia stream and the second multimedia stream have different directionalities,
- the first multimedia stream and the second multimedia stream each have any one of the following synchronizations: asynchronous, semi-synchronous, or synchronous, and
- the first multimedia stream and the second multimedia stream have different synchronizations.

19. The system of claim 17, wherein:
- the social multimedia server stores a quality of service (QoS) table specifying the first QoS threshold for the first multimedia stream and the second QoS threshold for the second multimedia stream, and
- either the first number of packets from the first sequence of packets, or the second number of packets from the second sequence of packets, or both, placed into the interleaved stream are based at least on a respective first or second QoS threshold in the QoS table.

* * * * *